Oct. 31, 1933.  E. E. WICKERSHAM  1,932,717
HARVESTER
Filed Nov. 3, 1930  6 Sheets-Sheet 1

FIG_1_

INVENTOR.
Elmer E. Wickersham
BY
ATTORNEYS.

Oct. 31, 1933.   E. E. WICKERSHAM   1,932,717
HARVESTER
Filed Nov. 3, 1930   6 Sheets-Sheet 4

INVENTOR.
Elmer E. Wickersham
BY
ATTORNEYS.

Patented Oct. 31, 1933

1,932,717

UNITED STATES PATENT OFFICE 1,932,717

HARVESTER

Elmer E. Wickersham, San Leandro, Calif., assignor to Caterpillar Tractor Co., San Leandro, Calif., a corporation of California Application November 3, 1930. Serial No. 493,043

58 Claims. (Cl. 56—23)

My invention relates to harvesting machinery and is especially concerned with windrow headers. Such machines are usually employed when it is desired to cut standing grain and to leave the grain lying in the field in windrows to dry or cure pending subsequent removal and disposition. A windrow header as now constructed is a vehicle which must be drawn over the field of standing grain by a separate draft mechanism, such as a tractor. The usual windrow header is provided with a single draper which discharges the cut grain to form a windrow at one side of the machine.

Although such devices mark a distinct improvement in the harvesting art they are subject to some disadvantages. For instance, in taking the initial cut of grain from a field surrounded with a fence it is necessary, in cutting the first peripheral swath of standing grain, to drive the draft vehicle in advance of the windrow header and thereby beat down a large quantity of valuable grain. It is also sometimes necessary to omit cutting a large portion of the otherwise available grain by virtue of the fact that such windrow headers cannot operate successfully close to fences, walls or similar boundaries. Furthermore, since during the first cut there is no clear field available, the cut grain must be deposited on standing grain which practically precludes making a proper windrow. Another consideration is that in practice it is sometimes advisable, particularly with light stands of grain, to space the resulting windrows relatively far apart so that they can be more easily gathered by a subsequent operation. That is, the contents of each windrow will be substantially the same as they would be were the stand of grain heavy and the windrows closer together. This is particularly important if the windrows are subsequently picked up by a vehicle, called a windrow pick-up, which is propelled over the field and automatically removes the windrows from the ground for ultimate disposition.

It is therefore an object of my invention to provide a motor harvester which is capable of cutting standing grain and depositing it in the field in windrows.

Another object of my invention is to provide a motor harvester which can operate close to fences, walls, or similar boundaries.

Another object of my invention is to provide a motor harvester capable of depositing windrows in any one of several selected locations on the ground.

Another object of my invention is to provide a motor harvester for windrow work which destroys practically no grain in opening up a field.

Another object of my invention is to provide a motor harvester which always deposits the cut grain on the ground.

The foregoing and other objects are attained in the embodiment of the invention shown in the drawings, in which.

In its preferred form, the motor harvester of my invention comprises a frame, including a power plant for propelling the frame over a field, on which is mounted a draper adapted to be driven by the power plant in either selected one of two opposite directions for depositing cut grain in either one of two optional locations upon the field.

In constructing the vehicle of my invention, there is preferably provided a frame 6 including a side rail 7 and a side rail 8 which at their rearward ends are brought into close juxtaposition and are secured to a block 9 on which a caster wheel 11 is mounted. The caster wheel is journalled between the arms of a fork 12 having an upwardly extending stem 13 thereon. The stem passes through block 9 and is engaged by a hand wheel 14 suitably journalled in the block 9 so that upon rotation of the hand wheel the relative vertical spacing between the frame 6 and the wheel 11 is varied and the frame can be varied in angular position relative to the field.

Substantially midway of the longitudinal dimension of my vehicle and generally forward of the center of gravity I provide bosses 16 and 17 through which axle tubes 18 and 19 pass. At the extremity of the axle tubes I preferably provide bearings 21 on which ground engaging members such as the wheels 22 and 23 are mounted. The caster wheel 11 and the wheels 22 and 23 provide a three point support for the mechanism so that it is easily able to negotiate hilly, uneven or undulatory territory with a minimum amount of strain.

In order to propel the carriage so constructed, I provide a power plant such as an internal combustion engine 26. The engine is of the ordinary water-cooled type and includes a radiator 27 mounted on the rails 7 and 8 and is preferably provided with a starting crank 28 projecting to a convenient location. The engine 26 also includes a flywheel housing 29 within which a flywheel 31 is positioned. The engine is supported at one end by arms 32 and 33 resting on and fastened to the side rails 7 and 8 and at the other end is supported by a transmission casing 34 secured to the flywheel housing 29 and carried not only by the axle tubes 18 and 19 but also by lugs 36 and 37 resting on a cross member 38 joined to the side rails 7 and 8.

To transmit power from the engine 26 to the ground engaging members 22 and 23, I provide a clutch 39 which is of the customary type and is controlled by a rod 41 actuated by a hand lever 42 conveniently placed for the vehicle operator. The clutch is connected to a change speed transmission 43 of the sliding gear type which affords, in the present instance, three speeds ahead and one reverse with a neutral position. The change speed mechanism is largely conventional and is controlled in the usual fashion by a shift lever 44 positioned within convenient reach of the vehicle operator.

From the change speed transmission 43 the power is transmitted through a bevel pinion 46 and a bevel gear 47 to a cross shaft 48 suitably mounted for rotation within the transmission housing 34. In order to steer the vehicle so that it can negotiate relatively sharp turns and follow sinuous paths I preferably provide steering clutches at the ends of shaft 48. For instance, the steering clutch 49 is mounted within the housing 34 and is engageable and disengageable through the agency of a lever 51 connected through a vertically journalled crank 52 for convenient manipulation by the vehicle operator. An axle 53 joins the driven member of clutch 49 to the ground engaging wheel 22 so that the wheel is driven by the engine 26 when the clutch 49 is engaged and is disconnected from the engine when the clutch 49 is disengaged. In a similar fashion a clutch 54 is provided with a control lever 56 extending to a steering crank 57 situated for convenient operation and connects with an axle 58 joined to the wheel 23. The operation of clutch 54 is identical with the operation of clutch 49 and by selectively operating the clutches either singly or in unison the vehicle operator is enabled to control to a nicety the direction of advance of the mechanism.

In order to retard motion of the motor harvester and also to assist in the steering operation particularly in negotiating sharp turns I preferably encompass each of the driven members of the clutches 49 and 54 with a friction brake. The brakes preferably comprise brake bands 59 and 61 connected by suitable linkages 62 and 63 to foot pedals 64 and 66 for individual or concurrent operation by the driver of the motor harvester.

In order to cut standing grain in the field upon advancing movement of the motor harvester, I preferably dispose transversely of the direction of advance of the vehicle and at the leading edge of the frame 6 a grain cutting and conveying mechanism generally designated 67. This mechanism preferably includes a sickle assembly 68 of any desired width, and comprises sickle guards 69 and a sickle bar 71. The guards are mounted on a transverse beam 72 joined at each end to the rails 7 and 8 and supported intermediate their ends by reinforcing members 73 and 74 projecting forwardly from the rails 7 and 8 and from the cross member 38. Immediately to the rear of the sickle assembly 68, I preferably dispose a draper 76. This draper is of any preferred construction and usually comprises a flexible belt provided with spaced sticks 77 secured thereto. The draper operates upon and is disposed around a pair of draper drums 78 and 79 journalled at opposite sides of the framework 6.

In accordance with my invention I provide means for driving the draper in either selected one of two opposite transverse directions so that the grain which is encountered by the vehicle and is cut by the sickle mechanism 68 and, further, is deposited upon the draper 76 can be discharged over either end thereof into windrows disposed either on the left side or on the right side of the motor harvester. To this end, each of the draper drums 78 and 79 is provided with a sprocket 81 and 82 with which chains 83 and 84 mesh. Also engaging the chains are sprockets 86 and 87 respectively mounted on shafts 88 and 89 extending into and journalled within the transmission casing 34. Within the transmission housing, the shafts 88 and 89 are provided with the movable members 91 and 92 of dog clutches, the driving members of which, 93 and 94, are suitably journalled in the transmission housing.

In order to shift the movable members 91 and 92 for selective engagement with the driving members 93 and 94, I provide a shifting yoke 96 controlled by an operator's crank 97 located above the transmission casing and within convenient reach of the operator. The driving members 93 and 94 are rotated in opposite directions by virtue of bevel pinions 98 and 99 meshing respectively with the bevel gear 47 and with a companion but reversed bevel gear 101. By proper manipulation of the yoke 97 the operator can engage either of the clutches 91 and 92 or can leave them both disengaged. If either of the oppositely driven clutches is engaged, the operation of the draper is in a corresponding direction. The operator thus has the option of driving the draper in either direction.

The drive for the sickle bar 71 is likewise derived from the vehicle engine and is immediately taken from the draper drum 78. This drum is provided with a crank 102 connected to a pitman 103 joined to the sickle bar 71 for reciprocatory movement. Despite the direction of operation of the draper 76 the sickle bar is properly operated to cut standing grain upon advancing movement of the motor harvester.

To assist in directing the cut grain onto the draper 76, I can provide a reel 106 of the customary kind mounted at the forward end of support bars 107 pivoted on uprights 108 secured to the frame 6 and adjustably held by straps 109. The reel is preferably driven by a chain 111 extending to a sprocket 112 provided with a clutch 113 which can be engaged or disengaged for transmitting or not transmitting power to the reel from a shaft 114 extending into the transmission case and driven by a chain 115 from the cross shaft 48.

Figure 1:
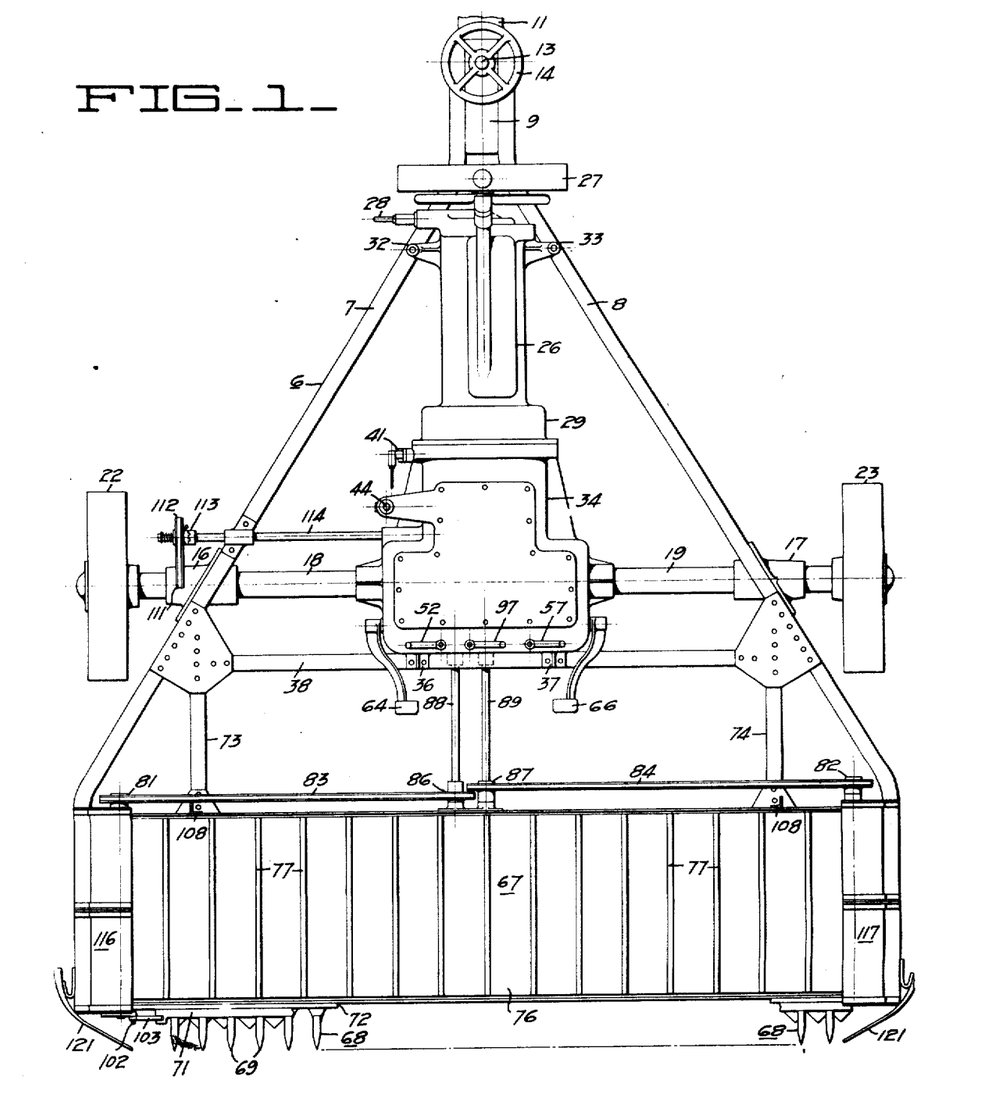
Fig. 1 is a plan of a motor harvester constructed in accordance with my invention.
Figure 2:
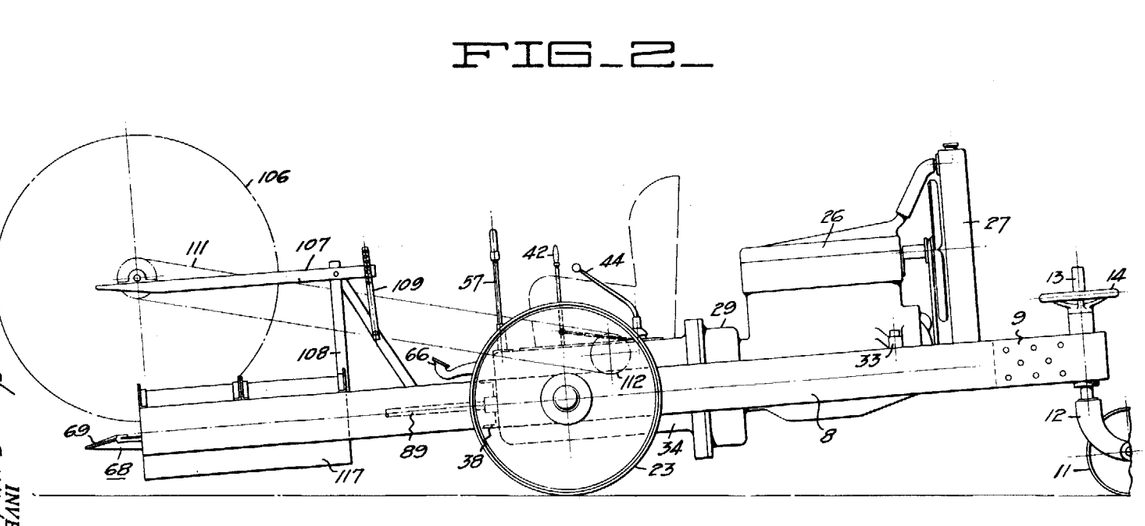
Fig. 2 is a side elevation of the motor harvester of my invention.
Figure 3:
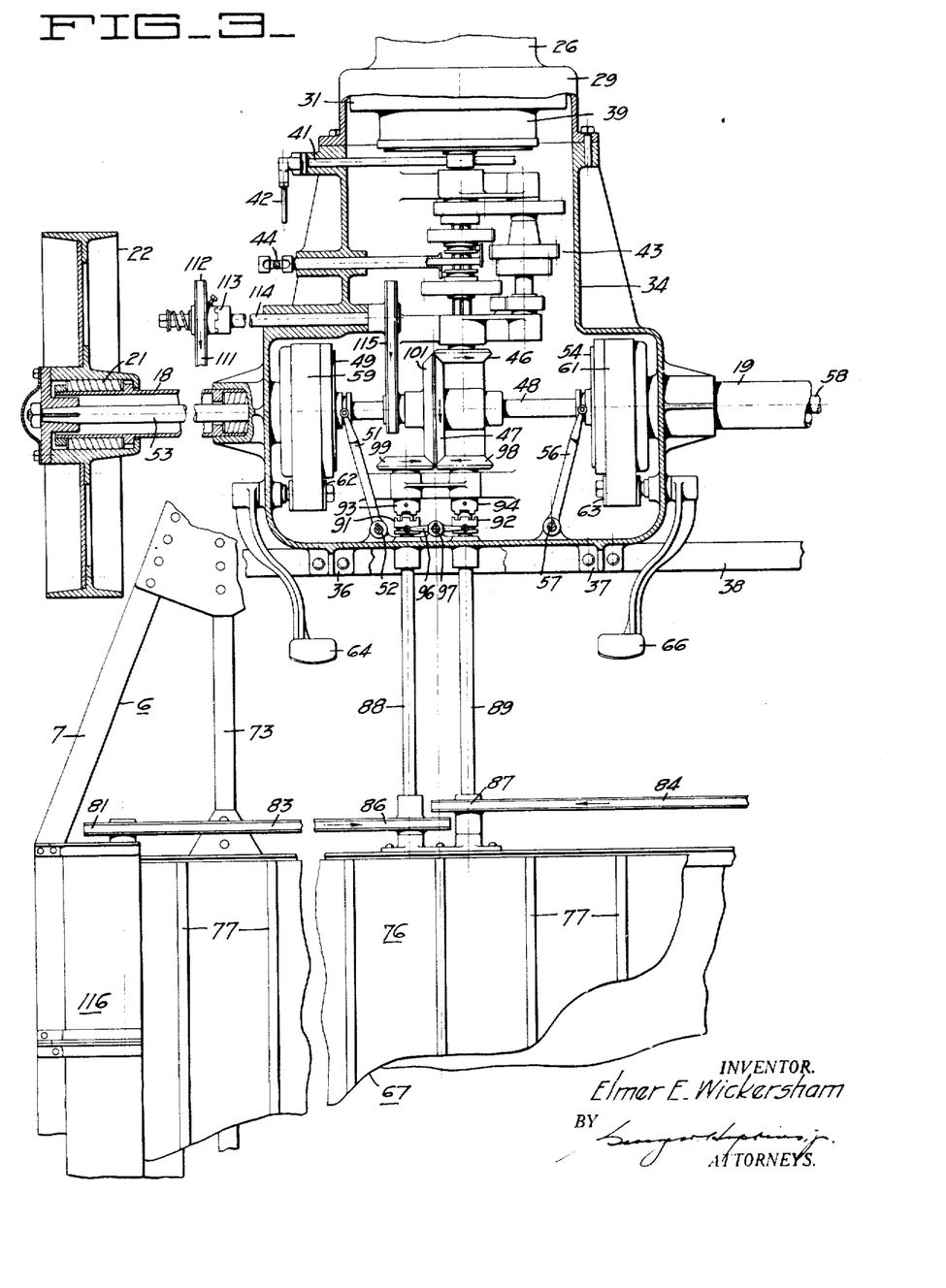
Fig. 3 is a detail showing the transmission housing in substantially horizontal cross section.
Figure 4:
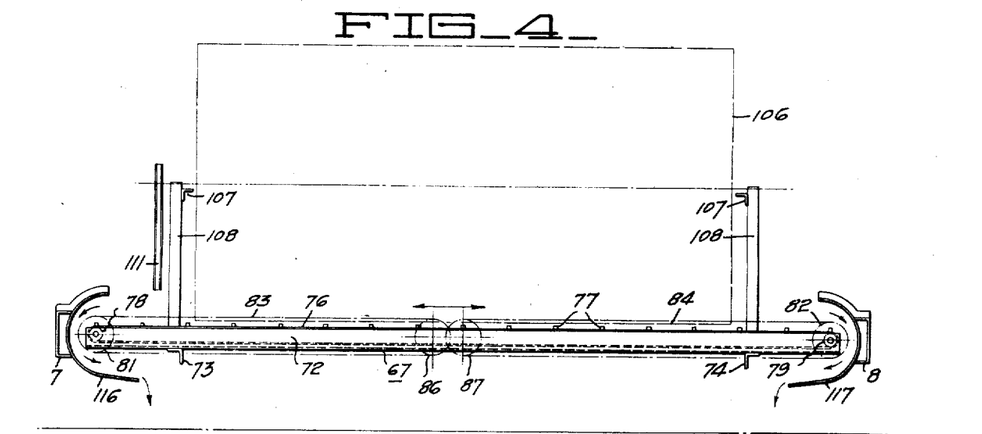
Fig. 4 is a front elevation of my motor harvester, portions being removed to clarify the disclosure.
Figure 5:
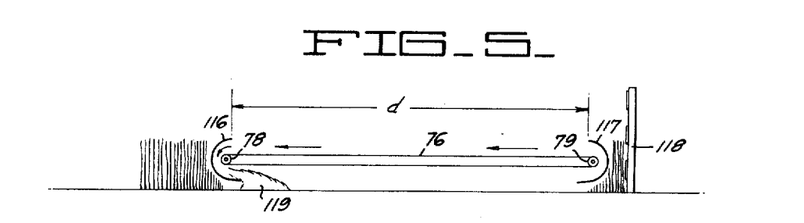
Fig. 5 is a front elevation, somewhat diagrammatic, of my motor harvester in operation close to a fence.

In operation of the motor harvester, the operator after starting the engine 26 engages one of the speeds of the change gear transmission 43 and engages the clutches 49 and 54. The vehicle then advances in a straight line. Upon approaching standing grain to be cut, the operator engages one or the other of the dog clutches 91 and 92 for driving the draper 76 in the desired or selected direction and for simultaneously driving the sickle bar 71. He may also engage the clutch 113 for operating the reel 106. Upon further advancing movement of the motor harvester the sickle bar 71 in conjunction with the sickle guards 69 cuts the standing grain which is impelled onto the draper 76 by the reel 106 and is conveyed toward one end or the other of the draper. Arriving at the end of the draper, the grain is discharged thereover and is directed by guides 116 and 117 disposed on the frame 6 and usually comprising arcuate metal sheets conforming to the general contour of the grain path desired. The effect is to discharge the grain in a windrow by laying the grain directly on the stubble in the path just cut by the motor harvester, as particularly disclosed in Fig. 5. To facilitate the entry of the harvester into standing grain, deflectors 121 are mounted at the leading ends of the side rails 7 and 8.

Since the draper 76 extends substantially for the width of the motor harvester a path is cut in advance of the mechanism so that no standing grain is beaten down. Furthermore, for opening fields of standing grain or for taking the initial cut adjacent a fence, for instance, the operation is shown diagrammatically in Fig. 5 in which the vehicle operator is cutting a swath of the width "d" and is operating very close to the fence 118 disclosed therein. The windrow produced is deposited preferably at the right end of the draper, as indicated at 119, although it can be deposited at the left end if desired.

Figure 6:
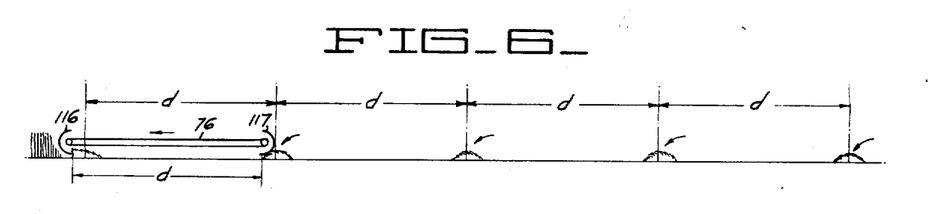
Fig. 6 illustrates my motor harvester diagrammatically in front elevation showing its use in spacing windrows closely in the field.
Figure 7:
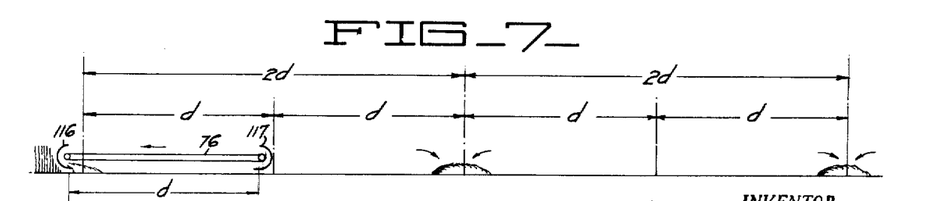
Fig. 7 is a view similar to Fig. 6 but showing the use of my motor harvester to space windrows far apart in the field.

Particularly in the case of a heavy stand of grain but in any event entirely at the operator's option, the windrows can be deposited relatively close together. As disclosed in Fig. 6 the width of the draper "d" is substantially the same as the distance between successive windrows. In this case the motor harvester is operated with the draper advancing always in the same direction and with the grain discharging always over the same end thereof. In Fig. 7 is disclosed the result of operation of the draper in opposite directions during alternate circuits of the field of standing grain so that although the draper width is still indicated as "d" the distance between successive windrows is "2d". This effect is gained by first operating the draper toward the left end thereof, for instance, and upon the next round of the field operating the draper to discharge over the right end thereof, thus depositing in one windrow the grain cut during two circuits of the field.

Figure 8:
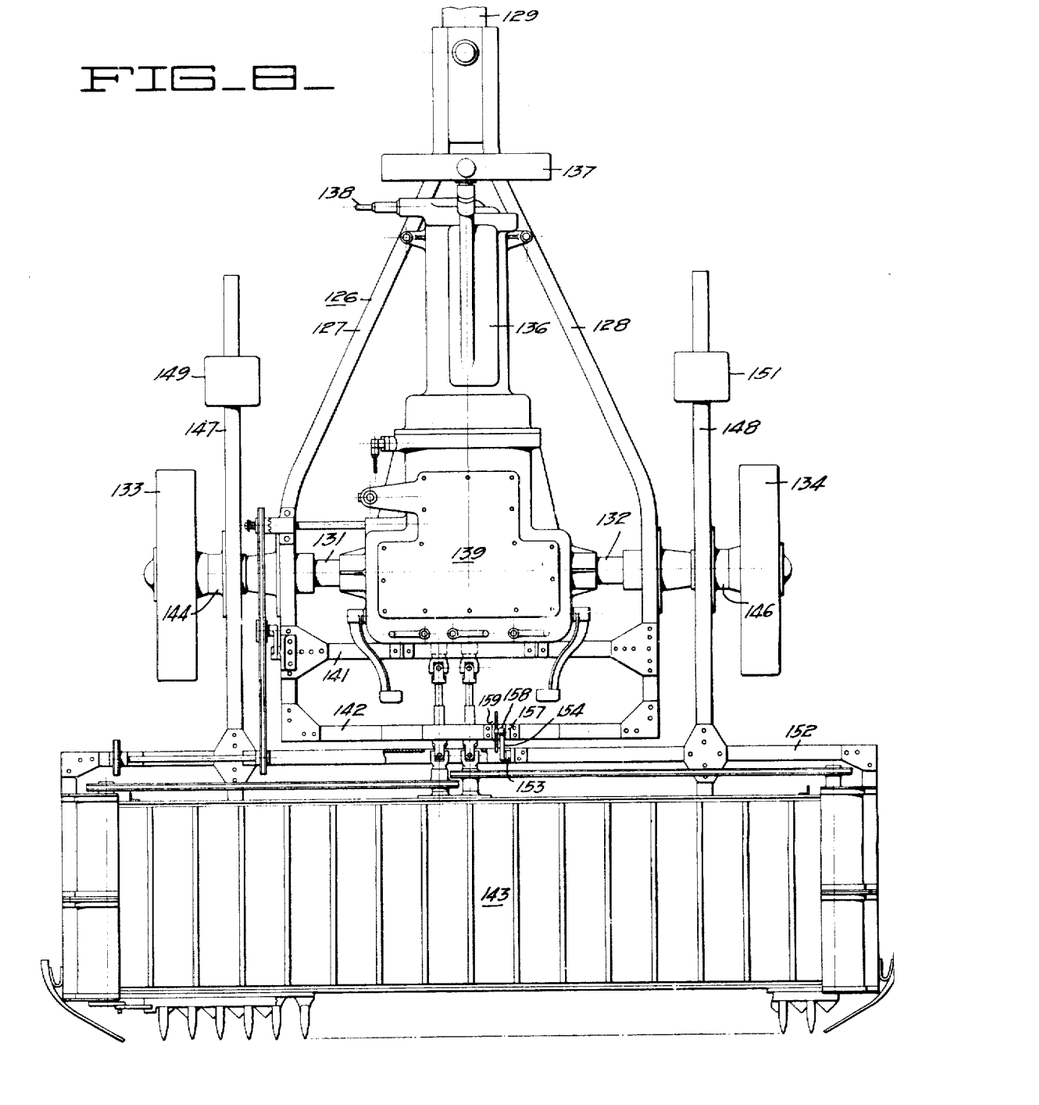
Fig. 8 is a plan of a modified form of motor harvester in accordance with my invention.
Figure 9:
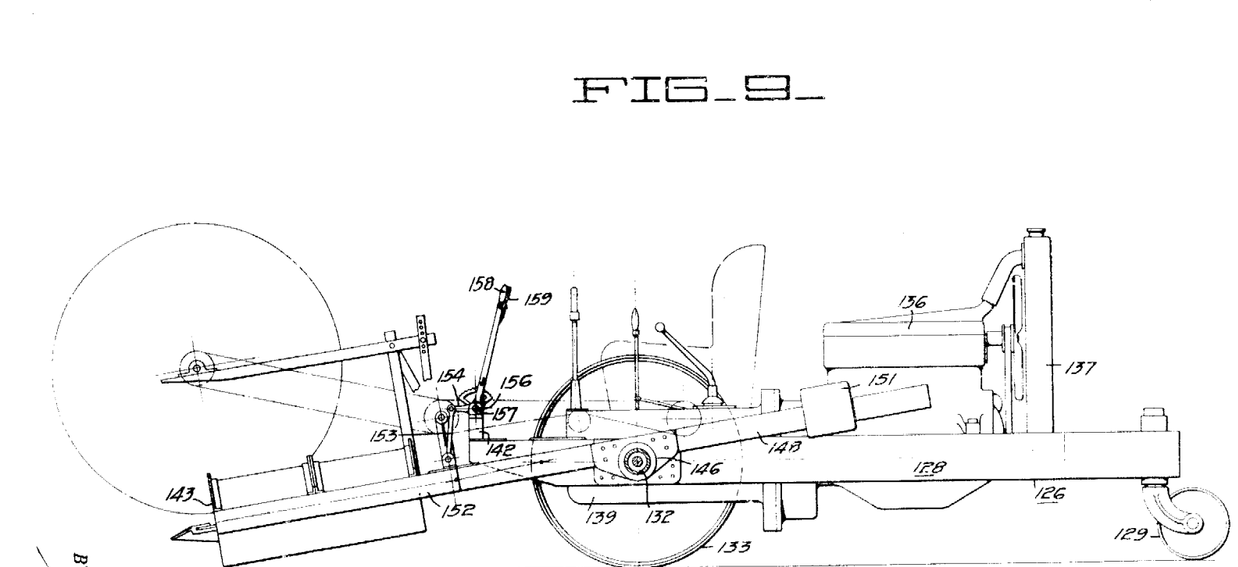
Fig. 9 is a side elevation of the motor harvester shown in Fig. 8.

In Figs. 8 and 9, I have shown a modified form of the motor harvester of my invention in which the major units are substantially as previously described but in which the framework is altered to improve the flexibility of the machine in traversing undulatory and irregular territory. In this modification I preferably provide a main frame 126, including side members 127 and 128, which is supported at its rearward end on a caster wheel 129 and intermediate its rearward and forward ends is mounted on axle tubes 131 and 132 extending to ground engaging wheels 133 and 134. Mounted on the frame 126 is an engine 136 provided with a radiator 137 and a starting crank 138. The engine is connected to a transmission 139 similar to the transmission previously described and capable of driving the wheels 133 and 134 in any manner selected by the vehicle operator.

Instead of extending forwardly to carry the draper unit, the frame 126 preferably terminates in a pair of cross members 141 and 142. In order to carry the draper assembly 143, I mount journals 144 and 146, respectively, on the axle tubes 131 and 132. Fastened to the journals and thereby rotatable about the axles are balance beams 147 and 148 at their rearward ends carrying counter weights 149 and 151 and at their forward ends joined to a frame 152 comprising the supporting structure for the draper assembly 143. The draper is thus substantially balanced on the axle tubes 131 and 132 and can be very easily rotated to raise or lower its leading edge.

In order to establish the height of the leading edge of the draper in accordance with the wishes of the operator I provide the frame 152 with a pivoted link 153 which is joined to a bell crank 154 pivoted, as at 156, to a bracket 157 on the frame 126. The bell crank 154 is provided with an operating handle 158 and with a ratchet control 159 for maintaining the handle in any adjusted position. By suitably operating the handle, the operator of the harvester can raise and lower the draper unit 143 with respect to the frame work 126 to cut standing grain at any selected height from the ground.

In accordance with my invention I have provided a motor harvester which not only can be propelled over uneven and undulatory territory under its own power and which is incapable of beating down standing grain but I have also provided a device which is capable of depositing windrows in either of several desired locations and which can take the initial swath in a field without destroying or losing a large proportion of the total grain available. In addition the entire structure is simple, easily maneuverable, light and cheap to manufacture.

It is to be understood that I do not limit myself to the form of the motor harvester shown and described herein, as the invention, as set forth in the following claims may be embodied in a plurality of forms.

I claim:

1. A windrow machine, comprising a header platform extending transversely of the line of draft of the machine, grain cutting mechanism at the leading edge of said platform, said cutting mechanism being adapted to leave a swath of stubble upon operation of the machine, means on the platform for conveying the cut grain toward an end of the platform, and means at said platform end for causing the cut grain to fall down onto said swath of stubble.

2. A windrow machine, comprising a header platform extending transversely of the line of draft of the machine, grain cutting mechanism at the leading edge of said platform, said cutting mechanism being adapted to leave a swath of stubble upon operation of the machine, means on the platform for optionally conveying the cut grain toward either end of the platform, and means at both ends of the platform for causing the cut grain to fall down onto said swath of stubble.

3. A windrow machine, comprising a header platform extending transversely of the line of draft of the machine, grain cutting mechanism at the leading edge of said platform, said cutting mechanism being adapted to leave a swath of stubble upon operation of the machine, means on the platform for conveying the cut grain toward an end of the platform, and deflecting means at said platform end, said deflecting means being shaped to direct the cut grain under the platform and down onto said swath of stubble.

4. A windrow machine, comprising a header platform extending transversely of the line of draft of the machine, grain cutting mechanism at the leading edge of said platform, said cutting mechanism being adapted to leave a swath of stubble upon operation of the machine, means on the platform for optionally conveying the cut grain toward either end of the platform, and deflecting means at both ends of the platform, each of said deflecting means being shaped to direct the cut grain under the platform and down onto said swath of stubble.

5. A windrow machine, comprising a header platform extending transversely of the line of draft of the machine, grain cutting mechanism at the leading edge of said platform, said cutting mechanism being adapted to leave a swath of stubble upon operation of the machine, the grain being deposited on the platform with stalks extending in the direction of said line of draft, means on the platform for conveying the cut grain toward an end of the platform with the stalks lying in the position in which they were deposited, and means at said platform end for causing the cut grain to move under the platform and down onto said swath of stubble with the position of the stalks relative to the line of draft of the machine unchanged.

6. A windrow machine comprising a header platform extending transversely of the line of draft of the machine, grain cutting mechanism at the leading edge of said platform, means on the platform for conveying the cut grain toward an end of the platform, and grain handling mechanism extending beyond said platform end for causing cut grain to fall down onto stubble beneath said conveying means.

7. A windrow machine comprising a header platform extending transversely of the line of draft of the machine, grain cutting mechanism at the leading edge of said platform, means on the platform for conveying the cut grain toward an end of the platform, and grain handling mechanism extending beyond said platform end for causing cut grain to fall down onto stubble with grain stalks extending in the direction of the line of draft of said machine.

8. A harvester comprising a frame, a pair of opposed arcuate deflectors at opposite sides of said frame, a draper on said frame between said deflectors, and means for driving said draper to discharge grain against either of said deflectors.

9. A harvester comprising a frame, a plurality of stationary deflectors on said frame, a draper on said frame, and means for operating said draper to discharge grain against any selected one of said deflectors.

10. A harvester comprising a draper, a plurality of stationary deflectors operatively associated with said draper, and means for operating said draper to discharge grain against any selected one of said deflectors.

11. A harvester comprising a grain carrier, a plurality of stationary deflectors operatively associated with said grain carrier, and means for operating said grain carrier to discharge grain against any selected one of said deflectors.

12. A motor harvester comprising a frame, ground engaging means for mobilely supporting said frame, a draper extending transversely of said frame, a sickle on said frame along the leading edge of said draper, and an engine on said frame connected to propel said harvester, drive said draper in either direction and operate said sickle.

13. A motor harvester comprising a frame, ground engaging members on opposite sides of said frame for supporting said frame, a draper extending transversely of said frame, a sickle on said frame along the leading edge of said draper, an engine on said frame, means for selectively connecting said engine to either or both of said members to propel and steer said harvester, means for connecting said engine to drive said draper selectively in either direction, and means for connecting said engine to operate said sickle.

14. A motor harvester comprising a generally triangular frame, a transverse axle pivotally connected to said frame, ground engaging members on said axle and disposed on opposite sides of said frame, an additional ground engaging member connected to said frame adjacent the apex thereof, a draper on said frame and extending transversely thereof, a sickle extending along the leading edge of said draper, an engine on said frame, means for selectively connecting said engine to either or both of said ground engaging members on said axle to propel and steer said harvester, means for connecting said engine to drive said draper selectively in either direction, and means for connecting said engine to operate said sickle.

15. In a harvester, a main axle, a header frame pivoted thereon and means to adjust said frame on said axle including a ground engaging member movable relative to said frame.

16. In a self-propelled harvester, a source of power, traction mechanism, harvesting mechanism including a draper and a sickle bar, and means to control operation of said mechanisms by said motor selectively in either direction or not at all.

17. In a self-propelled harvester, a source of power, a plurality of traction devices, reversible driving means for each of said traction devices, and harvesting mechanism comprising a sickle bar, a draper, reversible driving means for said sickle bar and said draper, and means to selectively control operation of said driving means by said source of power.

18. In a self-propelled harvester, a plurality of individually operable traction devices, a source of power for driving said devices, and a clutch and brake to control the operation of each of said devices.

19. In a harvester, a draper adapted to discharge grain, and deflector means cooperatively positioned at said discharge including a portion substantially parallel with said draper and another portion substantially parallel with the ground under stubble to lay grain from said draper onto said stubble.

20. In a harvester, a draper, a sickle along a portion of said draper, and deflector means for receiving grain from said draper and laying said grain on stubble substantially in the same plane as said sickle.

21. In a harvester, a draper, a sickle along a portion of said draper, and means for receiving grain from said draper and laying said grain on stubble substantially beneath said draper.

22. In a harvester, a sickle to cut standing grain and leave a stand of stubble, and conveyor means adapted to receive cut grain and lay said cut grain on said stubble with the stalks in substantially a position normal to the sickle.

23. In a harvester, a sickle to cut standing grain and leave a stand of stubble, and conveyor means adapted to receive cut grain and lay said cut grain on said stubble.

24. In a harvester, a sickle to cut standing grain and leave a stand of stubble, a planar draper positioned cooperatively adjacent said sickle and interrupting the fall of cut grain, and means including a portion substantially parallel to said draper and another portion substantially parallel with said stubble to receive grain from the ground under said draper.

25. In a harvester, a sickle to cut standing grain and leave a stand of stubble, a planar draper positioned cooperatively adjacent said sickle and interrupting the fall of cut grain, and means including a portion substantially parallel to said draper and another portion substantially parallel with the ground under said stubble to receive grain from said draper and lay said grain on said stubble.

26. A windrow machine, comprising a draper including an endless belt, roller means for supporting said belt, and stationary deflector means adjacent a turn of said belt to direct material in a predetermined manner onto the ground.

27. A windrow machine, comprising a draper including an endless belt having a discharge turn from which material is adapted to be discharged onto the ground, roller means for supporting said belt including a roller at said discharge turn, and an arcuate member extending about said belt and said roller at the discharge turn in spaced relationship thereto.

28. In a harvester, a draper, a roller, said draper passing over said roller to have an upper and a lower run, and a material directing member extending around said roller and having portions spaced from and substantially parallel with both said runs.

29. In a harvester, a draper, a roller, said draper passing over said roller to have an upper and a lower run, and conveyor means substantially parallel with both said runs and adapted to receive grain from said draper.

30. In a harvester, a draper, roller means, said draper being passed about said roller means to form the run of said draper, and conveyor means substantially continuing said run and spaced from said draper to convey grain below the plane of said draper.

31. In a harvester, a draper, roller means, said draper being passed about said roller means to form the run of said draper, and conveyor means substantially continuing said run and spaced from said draper to convey grain below the plane of said draper and along the lower run of said draper.

32. In a harvester, a draper, roller means, said draper being passed about said roller means to form the run of said draper, and stationary means substantially continuing said run and spaced from said draper to convey grain below the plane of said draper.

33. In a header, means for conveying grain cut by said header over a path extending to stubble of cut grain and underneath said conveying means.

34. In a header, a sickle for cutting grain and leaving stubble on a field, conveyor means adapted to receive and convey away from said sickle grain cut thereby, and means operatively disposed underneath said conveyor means and between said conveyor means and said field to transport said grain and lay said grain onto said stubble in said field.

35. In a header, a planar draper, and means interposed between the plane of said draper and a field for conveying material from said draper to said field.

36. In a header, a draper for transporting grain to discharge said grain, and means for receiving said grain from said draper and transporting said grain in a direction opposite to that of said draper.

37. In a header, a draper for transporting grain to discharge said grain, and means for receiving said grain from said draper and transporting said grain beneath said draper in a direction opposite to that of said draper.

38. In combination, a draper, and a chute member partially surrounding and spaced from said draper and adapted to discharge grain received from said draper beneath said draper.

39. A windrow machine, comprising a draper, and a chute member extending about a turn of and spaced from said draper to direct material onto a field.

40. A harvester comprising a frame, means for advancing said frame over the ground in a predetermined direction, a draper mounted on said frame and disposed transversely of the direction of advance of said frame, a sickle on said frame at the leading edge of said draper, means for driving said draper in either direction transversely of said direction of advance, and a sheet metal plate arcuate in form surrounding each end of said draper.

41. A harvester comprising a frame, a draper extending across the leading portion of said frame, a sickle disposed along the leading edge of said draper, means for driving said draper in either direction across said frame, and a deflector conforming in shape to each end of said draper and cooperatively spaced therefrom.

42. A harvester comprising a frame adapted to advance in a predetermined direction, a draper disposed transversely of said frame, means for driving said draper in either transverse direction, and a deflector surrounding each end of said draper and spaced therefrom.

43. A harvester comprising a frame, a draper on said frame, means for driving said draper in either of two opposite directions, and deflector means for laying grain from said draper on stubble beneath said draper in either direction of movement of said draper.

44. A harvester comprising a frame, a draper on said frame, said draper being adapted to receive grain substantially throughout its length, and means for selectively laying said grain from either end of said draper onto stubble.

45. A harvester comprising a frame, a pair of opposed arcuate deflectors at opposite sides of said frame, a draper on said frame between said deflectors, and means for driving said draper to discharge grain against either of said deflectors whereby said grain is laid on stubble beneath said frame.

46. A harvester comprising a frame having a draper thereon, a plurality of deflectors on said frame, each having a portion extending beneath said draper and means for operating said draper to discharge grain against any selected one of said deflectors.

47. A harvester comprising a draper, a plurality of deflectors operatively associated with said draper and substantially continuing said draper to stubble level, and means for operating said draper to discharge grain against any selected one of said deflectors.

48. A harvester comprising a grain carrier, a plurality of deflectors operatively associated with said grain carrier at the ends thereof, said deflectors being adapted to receive grain from said carrier and lay said grain on stubble in substantially that position in which said grain is received from said carrier, and means for operating said grain carrier to discharge grain against any selected one of said deflectors.

49. A harvester comprising a frame, a draper mounted on said frame and adapted to receive grain, means on said frame for driving said draper to discharge said grain from either end of said draper, and a generally semi-circular deflector at each end of said draper.

50. A harvester comprising a frame, a draper mounted on said frame and adapted to receive grain, means for driving said draper to discharge said grain from either end of said draper, and conveyor means cooperatively associated with each end of said draper to lay grain onto stubble beneath the draper.

51. A harvester comprising a sickle, a draper, and conveyor means to receive grain from said draper and lay said grain on stubble beneath the draper.

52. A windrow machine comprising a frame, a draper on said frame having an upper conveying reach, an under return reach and a discharge turn, said draper being bodily fixed on said frame against endwise displacement, and means adjacent said discharge turn for directing material discharged from the draper to a position beneath said return reach.

53. A windrow machine comprising a frame, a draper on said frame having an upper conveying reach, an under return reach and a discharge turn, said draper being bodily fixed on said frame against endwise displacement, and stationary deflector means adjacent said discharge turn for directing material discharge from the draper to a position beneath said return reach.

54. A windrow machine comprising a frame, a draper on said frame having an upper conveying reach, an under return reach and a discharge turn, said draper being bodily fixed on said frame against endwise displacement, and a deflecting member adjacent said discharge turn, said deflecting member having a portion extending underneath said return reach to direct material to a position beneath said return reach.

55. In a harvester, a frame, a header mounted on said frame, and means for adjusting said header relative to the ground, including a ground-engaging member mounted for movement relative to said frame.

56. In a harvester, a frame, a header mounted on said frame at one end thereof, means for pivotally supporting said frame intermediate its ends, and means for adjusting said header relative to the ground, including a ground-engaging member mounted for movement relative to said frame at the opposite end thereof.

57. In a harvester, a frame, a header mounted on said frame at the front end thereof, means for pivotally supporting said frame intermediate its ends, a ground-engaging caster wheel on said frame adjacent the rear end thereof, and means for mounting said caster wheel for movement with respect to said frame to adjust said header relative to the ground.

58. In a harvester, a frame, a header mounted on said frame at the front end thereof, means for pivotally supporting said frame intermediate its ends including traction devices for steering the harvester, a ground-engaging caster wheel on said frame adjacent the rear end thereof said caster wheel being free to turn responsive to steering of said harvester, and means for mounting said caster wheel for movement relative to said frame to adjust said header relative to the ground.

ELMER E. WICKERSHAM.

CERTIFICATE OF CORRECTION.

Patent No. 1,932,717.  October 31, 1933.

ELMER E. WICKERSHAM.

It is hereby certified that error appears in the printed specification of the above numbered patent requiring correction as follows: Page 5, lines 18 and 19, claim 24, for "said stubble to receive grain from the ground under" read the ground under said stubble to receive grain from; page 6, line 79, claim 53, for "discharge" read discharged; and that the said Letters Patent should be read with these corrections therein that the same may conform to the record of the case in the Patent Office.

Signed and sealed this 12th day of December, A. D. 1933.

F. M. Hopkins (Seal)   Acting Commissioner of Patents.

to discharge grain against any selected one of said deflectors.

47. A harvester comprising a draper, a plurality of deflectors operatively associated with said draper and substantially continuing said draper to stubble level, and means for operating said draper to discharge grain against any selected one of said deflectors.

48. A harvester comprising a grain carrier, a plurality of deflectors operatively associated with said grain carrier at the ends thereof, said deflectors being adapted to receive grain from said carrier and lay said grain on stubble in substantially that position in which said grain is received from said carrier, and means for operating said grain carrier to discharge grain against any selected one of said deflectors.

49. A harvester comprising a frame, a draper mounted on said frame and adapted to receive grain, means on said frame for driving said draper to discharge said grain from either end of said draper, and a generally semi-circular deflector at each end of said draper.

50. A harvester comprising a frame, a draper mounted on said frame and adapted to receive grain, means for driving said draper to discharge said grain from either end of said draper, and conveyor means cooperatively associated with each end of said draper to lay grain onto stubble beneath the draper.

51. A harvester comprising a sickle, a draper, and conveyor means to receive grain from said draper and lay said grain on stubble beneath the draper.

52. A windrow machine comprising a frame, a draper on said frame having an upper conveying reach, an under return reach and a discharge turn, said draper being bodily fixed on said frame against endwise displacement, and means adjacent said discharge turn for directing material discharged from the draper to a position beneath said return reach.

53. A windrow machine comprising a frame, a draper on said frame having an upper conveying reach, an under return reach and a discharge turn, said draper being bodily fixed on said frame against endwise displacement, and stationary deflector means adjacent said discharge turn for directing material discharge from the draper to a position beneath said return reach.

54. A windrow machine comprising a frame, a draper on said frame having an upper conveying reach, an under return reach and a discharge turn, said draper being bodily fixed on said frame against endwise displacement, and a deflecting member adjacent said discharge turn, said deflecting member having a portion extending underneath said return reach to direct material to a position beneath said return reach.

55. In a harvester, a frame, a header mounted on said frame, and means for adjusting said header relative to the ground, including a ground-engaging member mounted for movement relative to said frame.

56. In a harvester, a frame, a header mounted on said frame at one end thereof, means for pivotally supporting said frame intermediate its ends, and means for adjusting said header relative to the ground, including a ground-engaging member mounted for movement relative to said frame at the opposite end thereof.

57. In a harvester, a frame, a header mounted on said frame at the front end thereof, means for pivotally supporting said frame intermediate its ends, a ground-engaging caster wheel on said frame adjacent the rear end thereof, and means for mounting said caster wheel for movement with respect to said frame to adjust said header relative to the ground.

58. In a harvester, a frame, a header mounted on said frame at the front end thereof, means for pivotally supporting said frame intermediate its ends including traction devices for steering the harvester, a ground-engaging caster wheel on said frame adjacent the rear end thereof said caster wheel being free to turn responsive to steering of said harvester, and means for mounting said caster wheel for movement relative to said frame to adjust said header relative to the ground.

ELMER E. WICKERSHAM.

CERTIFICATE OF CORRECTION.

Patent No. 1,932,717.

October 31, 1933.

ELMER E. WICKERSHAM.

It is hereby certified that error appears in the printed specification of the above numbered patent requiring correction as follows: Page 5, lines 18 and 19, claim 24, for "said stubble to receive grain from the ground under" read the ground under said stubble to receive grain from; page 6, line 79, claim 53, for "discharge" read discharged; and that the said Letters Patent should be read with these corrections therein that the same may conform to the record of the case in the Patent Office.

Signed and sealed this 12th day of December, A. D. 1933.

F. M. Hopkins (Seal)

Acting Commissioner of Patents.

CERTIFICATE OF CORRECTION.

Patent No. 1,932,717.  October 31, 1933.

ELMER E. WICKERSHAM.

It is hereby certified that error appears in the printed specification of the above numbered patent requiring correction as follows: Page 5, lines 18 and 19, claim 24, for "said stubble to receive grain from the ground under" read the ground under said stubble to receive grain from; page 6, line 79, claim 53, for "discharge" read discharged; and that the said Letters Patent should be read with these corrections therein that the same may conform to the record of the case in the Patent Office.

Signed and sealed this 12th day of December, A. D. 1933.

F. M. Hopkins (Seal)  Acting Commissioner of Patents.